United States Patent [19]
Dillon

[11] Patent Number: 5,274,926
[45] Date of Patent: Jan. 4, 1994

[54] ANTENNA AIMING INSTRUMENT

[76] Inventor: Kelly Dillon, 29393 7th Pl. S, Federal Way, Wash. 98003

[21] Appl. No.: 984,847

[22] Filed: Dec. 3, 1992

Related U.S. Application Data

[63] Continuation-in-part of Ser. No. 893,795, Jun. 4, 1992, abandoned.

[51] Int. Cl.$^5$ .............................................. G01C 1/00
[52] U.S. Cl. ..................................... 33/273; 33/1 DD; 33/268
[58] Field of Search ................. 33/273, 268, 271, 272, 33/1

[56] References Cited

U.S. PATENT DOCUMENTS

| | | | |
|---|---|---|---|
| 3,940,858 | 3/1976 | Perrotti et al. | 33/504 |
| 4,236,313 | 12/1980 | Griffin, Jr. | 33/273 |
| 4,288,922 | 9/1981 | Lewis | 33/273 |
| 4,454,658 | 6/1984 | Lewis | 33/273 |

Primary Examiner—William A. Cuchlinski, Jr.
Assistant Examiner—C. W. Fulton
Attorney, Agent, or Firm—Robert W. Jenny

[57] ABSTRACT

The instrument comprises a sphere mounted in a holder between two rings, so that the sphere is held in specific spatial relationship to holes in the holder which define a line of sight of the instrument. A flat cylindrical assembly comprising a bubble level and a compass is mounted on the sphere with the center of the assembly at a point which represents the point on the earth's surface intersected by a line from the earth's center to the geostationary satellite served by the instrument. The assembly touches and moves between the rings. A mark on this assembly points in the direction of a point on the sphere which represents true North relative to the center of the assembly. A map of the area served by the satellite is marked on the sphere. A scale marked in degrees and having a base point is mounted between the rings with its centerline parallel to the rings. The map is marked with points representing major locations at which antennas may be located. In use the sphere is moved in the holder so that the selected point is under the base point on the scale and then the instrument is positioned so that the north end of the needle points at the mark on the assembly and the bubble is centered in the level. The map is distorted, to account for magnetic and gravitational deviations such that when the above described procedure is followed the line of sight is aimed at the satellite.

1 Claim, 1 Drawing Sheet

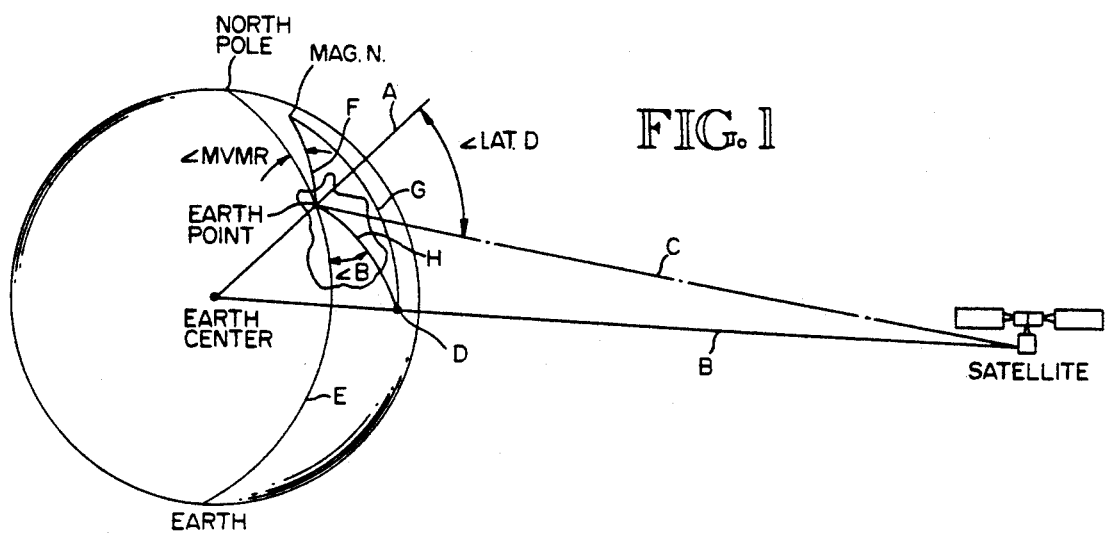
FIG. 1
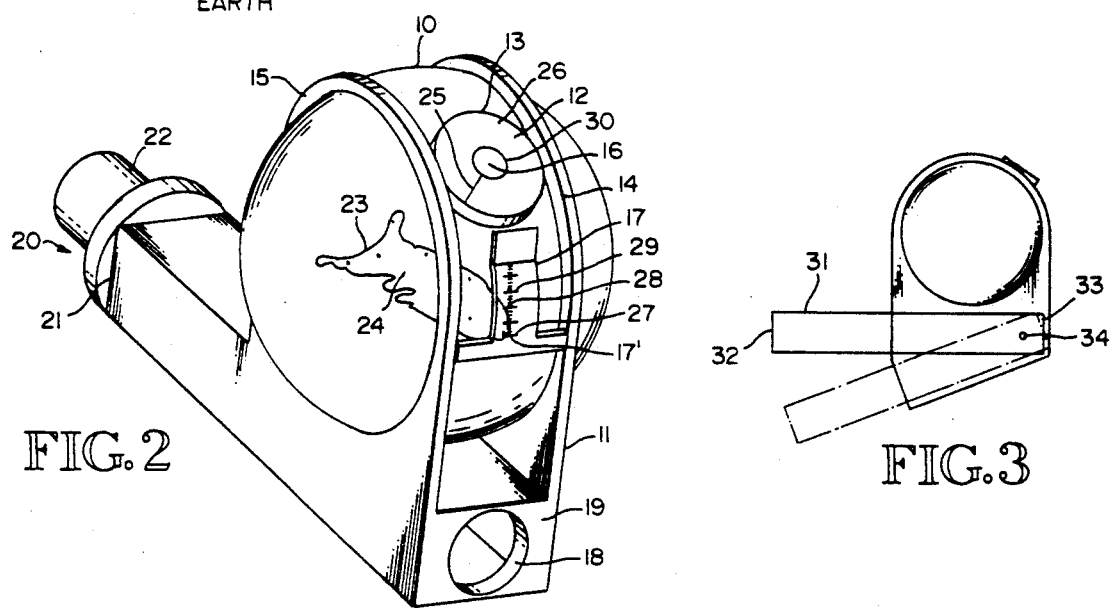
FIG. 2
FIG. 3
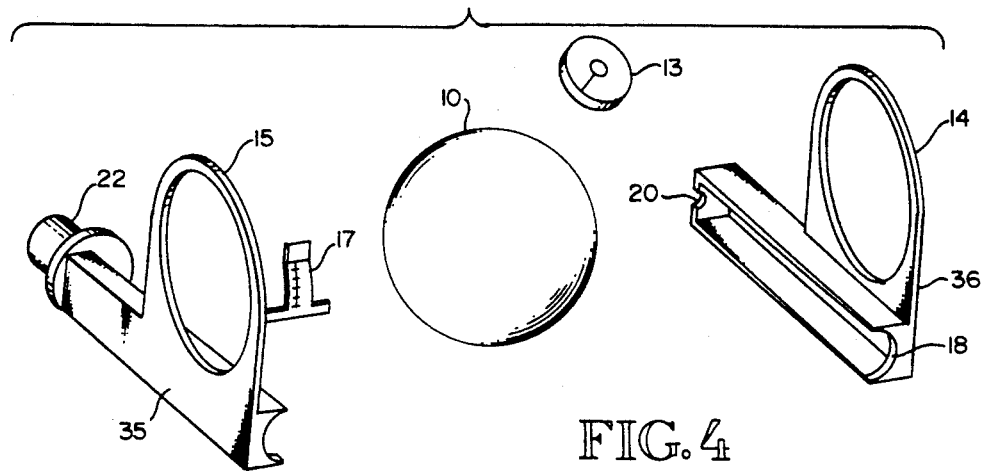
FIG. 4

ANTENNA AIMING INSTRUMENT

This application is a Continuation-In-Part application based on U.S. patent application Ser. No. 893,795, filed Jun. 4, 1992 by the same inventor and now abandoned.

BACKGROUND OF THE INVENTION

1. FIELD

The subject invention is in the field of instruments used for surveying, navigation and astronomy. More specifically it is in the field of instruments used to aim an antenna at a selected point on the earth's surface toward a selected satellite in geostationary orbit in relation to the earth.

2. PRIOR ART

The United States patents listed here are examples of prior art to the subject invention.

U.S. Pat. Nos. 4,138,826; 4,288,922 and 4,454,658

The devices described in these patents and all other similar devices known to the inventor of the subject invention require, during their use, sources of specific kinds of information such as latitude and longitude of the location of the earth mounted antenna, the declination angle at which to set the instrument, and the data which locates the direction in which a selected satellite lies with respect to the location of the earth mounted satellite. The needs for these kinds of data at the time of use of instruments is inconvenient, may lead to a requirement for a number of instruments to service the area of the earth served by one specific satellite and, in particular, requires more time for each use, adds to the chances for error and requires considerable training and skill in the use of such instruments.

Accordingly, the primary objective of the subject invention is to provide an instrument for accurately aiming antennas in the area served by a satellite toward the antenna on the satellite without need for using supportive data and/or calculations in the process. Other objectives are that the instrument be compact, durable, easy to use and relatively inexpensive to manufacture.

SUMMARY OF THE INVENTION

The subject device enables a user to accurately and easily position an antenna so that the focal line of the antenna is aimed directly from any one of a plurality of specific points on earth toward an antenna on a satellite which is orbiting in a fixed position relative to the earth, i.e. in geostationary orbit. The device may be considered to be a specialized scale model of the earth fitted in a holder with the model being adjustably positioned in the holder. When (1) the model is positioned in the holder such that the positioning meets certain criteria and (2) the device is positioned such that the model is (a) oriented properly with respect to the center of the earth and (b) oriented properly with respect to the direction of the true North pole (as different from magnetic north) from the earth point, a line of sight on the device will be aimed directly at the satellite antenna.

The criteria for positioning the model in the device are as follows: There is a map, on the surface of the model, of the area of the earth's surface served by the satellite and there are a series of indicia points on the holder. The model is positioned in the holder such that the appropriate indicia point is positioned over the specific point on the earth's surface from which an antenna, i.e. an earth mounted antenna, is being aimed. If the earth mounted antenna is not an offset antenna, the first, (base) point in the series of indicia points is located over the earth point on the map. The remaining indicia points are spaced 1° apart along a line on the support and if the earth mounted antenna is offset a particular number of degrees, the indicia point that number of degrees from the base point is positioned over the earth point. The indicia points are positioned in line between the first point and the center of a leveling dome and compass assembly mounted on the model (sphere) and described below.

Orienting the device properly with respect to the center of the earth is done using a bubble level mounted on the model. When the bubble is centered, a line through the center of the bubble and the center of the sphere will be aimed at the center of the earth (with exceptions noted and compensated for as described later).

Orienting the device with respect to the direction of the North pole from the earth point is done using a compass mounted on the sphere and positioning the device so that the North end of the compass needle aligns with a line fixedly positioned on the sphere.

In order for the device to work, the map on the sphere must be accurately distorted to account for a variety of factors, including the facts that at any given point on earth the direction from that point to true North and magnetic North are some degrees apart and the direction of the force of gravity at that point may not point directly to the center of the earth. Other factors influencing the distortion involve the spherical trigonometry relating three lines, one from the center of the earth through a given earth point, a second from the center of the earth to the satellite antenna and a third from the earth point to the satellite antenna.

The geometry involved is illustrated in FIG. 1 with the 3 lines noted above marked A, B and C respectively. Line B intersects the earth's surface at D. Line E is the Polar Great Circle for the selected earth point and is a great circle line connecting the true North and South poles and the earth point.

Line F extends from the earth point to magnetic North relative to the earth point. Line G extends from magnetic North for the earth point to point D. Line H extends from point D to the earth point.

The angle between lines E and F is labeled Mvar - noting magnetic variation between true North and magnetic North at the earth point. This angle is determined, for calculation purposes, by referring to Magnetic Variance maps and charts for specific areas because such variance cannot be geometrically calculated. The angle between lines A and C is labeled latD signifying the latitudinal distance of the earth point from point D and taking into account any deviation of the direction of line A from a line intersecting the earth point and the true center of the earth. The angle between lines E and H is labeled and relates to the distance of point D from line E.

In the device the level, called a leveling dome, and the compass are mounted in a flat cylindrical housing which is attached to the sphere with its center at a point representing point D on the earth. The mark with which the north point of the compass is aligned is positioned so that when the north point of the compass is aligned with the mark it points in the direction of the point on the sphere which represents the true North pole on the earth in relation to the map on the sphere.

Data is available from which to assign values to all the variables, coordinates of all points, etc. listed above for any given earth point so that a person with a working knowledge of spherical trigonometry can, with the help of computers to augment speed and accuracy, determine the locations on the sphere representing earth points at which antennas to be focused may be located. With enough points so located, the map of the area served by the satellite can be made and indicated on the sphere, such as by etching. The map is noticeably distorted because of magnetic and gravitational deviations as well as longitudinal offset (from due South) and polar declination of satellites as they descend more in latitude the farther they are away from due South. This distortion of the map and related reference to it are primary novel features of the subject invention.

The subject invention is described in more detail below with reference to the attached drawings.

BRIEF DESCRIPTIONS OF THE DRAWINGS

FIG. 1 is a schematic representation illustrating the spherical trigonometry involved in the solution provided by the subject invention to the problem of aiming an antenna from one of a plurality of earth points toward a satellite antenna without use of reference data and the like.

FIG. 2 is an isometric view of the subject instrument.

FIG. 3 illustrates schematically an alternate embodiment accounting for offset of an earth mounted antenna.

FIG. 4 is an exploded isometric view illustrating the basic features of the construction of the instrument.

DETAILED DESCRIPTION OF THE INVENTION

The subject invention is an instrument used for aiming an antenna mounted at any one of a plurality of 12 points in the area of the earth's surface served by a satellite in geostationary orbit toward the antenna on the satellite. FIG. 1, as described in the Summary of the Invention in this application, illustrates all the factors involved in the conception and use of the subject instrument. The embodiment of the invention described herein serves a particular satellite and the area of the earth's surface served by that satellite. In modified embodiments such an instrument can serve more than one satellite.

FIG. 2 is an isometric view of the subject instrument which comprises a sphere 10 mounted free to move in a holder 11. Combination bubble level and compass assembly 12 is attached to the sphere (described in more detail below). The level/compass assembly has a cylindrical perimeter 13 and is mounted in the holder with that assembly between arches 14 and 15. The flat surface of the assembly is normal to a radius from the center of the sphere through the center of the assembly. This arrangement confines movement of the sphere in the holder to two degrees of freedom: (1) rotation about a first axis through the center 16 of the level/compass assembly and the center of the sphere and (2) rotation about a second axis which intersects the first axis at the center of the sphere and is perpendicular to it. Reference member 17 is mounted between the arches as shown for purposes described below. There are coaxial holes in the holder, hole 18 at end 19 of the holder and hole 20 (not visible in this view) at end 21. The centers of these holes define the line of sight in the instrument. The line of sight is in the plane of rotation of the first axis about the second and, by use of the subject instrument, is aimed at the satellite antenna. Fixture 22 can be mounted in hole 18 or in hole 20 and is an adapter used for attaching the instrument to an earth mounted antenna such that when the instrument is aimed at the satellite antenna, so is the earth mounted antenna. Map 23 marked on the sphere is a map of the area of the earth's surface served by the satellite. There is a plurality of points marked on the map, point 24 being typical. Each point represents a particular prominent location on the earth's surface, such as a city, at which an earth mounted satellite to be aimed may be located.

For the satellite being served by the instrument, a straight line between the true center of the earth and the satellite would intersect a point on the earth's surface (point D in FIG. 1, termed the intersection point for purposes of this disclosure). The level/compass assembly is mounted on the sphere with its center 16 at a point on the sphere which represents the intersection point on the earth relative to map 23. Line 25 on surface 26 of the level/compass assembly points from the assembly center 16 toward the point on the sphere (not visible in this view) which represents on the sphere the location of the true North pole on the earth, relative to map 23. The location of member 17 and reference point 17 in the holder is determined using spherical trigonometry. Baseline 27 of indicia 28 on the scale is parallel to the arches and each crossmark, mark 29 being typical, represents one degree. The purpose of these indicia is explained below.

To aim the line of sight of the instrument toward the antenna of the satellite the sphere is first moved in the holder so that point 30 on the scale is directly over the point on the map which represents the location at which the instrument is being used. The instrument is positioned so that the north end of the compass needle (not shown) is aligned with line 25 and the bubble (not shown) in the level/compass assembly is centered in hole 31. With these two adjustments made, the line of sight of the instrument is aimed at the satellite antenna. This simple alignment procedure is enabled by the distortion of the map on the sphere, compared to a geographical map, as dictated by spherical trigonometry to account for all the factors involved in the alignment which would otherwise require a series of data determinations, calculations and corresponding instrument adjustments in each use of the instrument.

If the antenna being aimed is offset by a number of degrees, this is taken into account by aligning the crossmark on the scale representing that number of degrees over the map point being used.

FIG. 3 illustrates an embodiment using an alternate technique for accounting for antenna offset. In this embodiment there is only one point on the scale and a hollow assembly 32 having holes (not shown) in its ends 33 and 34 is pivoted in the holder at 35. In its zero offset setting assembly 32 is positioned so that the line of sight through it is perpendicular to a radial line from the center of the sphere and intersecting the line of sight. To compensate for offset the assembly is pivoted away from the sphere a number of degrees equal to the number of degrees of offset of the antenna.

Another alternate technique for accounting for the offset of an antenna is to use a mounting bracket which can be tilted to produce the same change in position of the instrument as effected by the apparatus shown in FIG. 3.

FIG. 4 is an exploded isometric view of the instrument illustrating one embodiment of its construction in which the holder is made from mirror image halves 36 and 37.

It is considered to be well within the capabilities of persons of ordinary skill in the art to determine and provide any and all details of construction of the instrument not covered in this description. Further it is considered t be understandable from this description that the invention meets its objectives. It provides an instrument which makes it possible to accurately aim antennas in the area served by a satellite in geostationary orbit without need for using supporting data and/or calculations in the process. The instrument is compact, easy to use and durable and relatively inexpensive to manufacture because of its simplicity of construction.

It is also considered to be understood that while certain embodiments of the invention are described herein, other embodiments and modifications of those described are possible within the scope of the invention which is limited only by the attached claims.

I claim:

1. Apparatus for use on an area of the surface of the earth, said earth having a center, for aiming a line of sight to an object in geostationary orbit about said earth from any one of a plurality of points in said area, there being on said surface a true North pole and a point of intersection on said surface of a line between said center of the earth and said object, said apparatus comprising:
  a sphere,
  a level/compass assembly,
  a holder,
  a member having a reference point,
  said sphere having a center and a surface, a first point on said sphere surface representing said North pole, a second point on said sphere surface representing said intersection point and a map on said sphere surface representing said area of the earth's surface served by said satellite,
  said level/compass assembly having a circular bubble level, a compass needle and a North point of said needle, a center and being attached to said sphere with said center at said second point, said level/compass assembly having a surface essentially normal to a radius from said center of said sphere through said center of said level/compass assembly and having a line marked on said level/compass assembly surface directed from said center of said level/compass assembly toward said point representing said North pole,
  said sphere being mounted in said holder such that it has first and second degrees of freedom, said first degree being freedom to rotate about a first axis intersecting said center of said sphere and said center of said level/compass assembly, said second degree being freedom to rotate about a second axis through said center of said sphere and perpendicular to said first axis, whereby movement of said sphere about said second axis moves said first axis in a first plane,
  said holder further comprising first and second holes having first and second centers such that a line intersecting said first and second centers defines a line of sight lying in said first plane,
  said member having a reference point being such that said reference point is in said first plane, said map on said sphere surface having a plurality of points indicated on it, each of said points representing a location on said earth's surface at which said antenna mounted on the earth may be located, said map being plotted using spherical trigonometry involving all known factors and variables effecting and affecting the use and the accuracy of said use of said instrument, said map being accordingly distorted compared to a geographical map of the same area of the earth's surface,
  whereby, in the use of said instrument, when said sphere is moved in said holder such that said indicator point is over a selected one of said plurality of points on said map and said instrument is oriented such that said bubble level indicates that said level/compass assembly surface is level and said North point of said compass needle is aligned with said mark on said level/compass assembly surface, said line of sight is accurately aimed at said satellite.

* * * * *